United States Patent
Sakagami et al.

(10) Patent No.: US 8,500,596 B2
(45) Date of Patent: Aug. 6, 2013

(54) VEHICLE DRIVE FORCE DISTRIBUTING APPARATUS

(75) Inventors: Egio Sakagami, Kawasaki (JP); Katsuyoshi Ogawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 235 days.

(21) Appl. No.: 13/118,193

(22) Filed: May 27, 2011

(65) Prior Publication Data

US 2011/0319223 A1    Dec. 29, 2011

(30) Foreign Application Priority Data

Jun. 29, 2010   (JP) ................................. 2010-147112

(51) Int. Cl.
*F16H 13/00*   (2006.01)
(52) U.S. Cl.
USPC ................... 476/48; 476/1; 476/61
(58) Field of Classification Search
USPC .................... 476/1, 2, 3, 47, 48, 61
See application file for complete search history.

(56) References Cited

U.S. PATENT DOCUMENTS

| | | | |
|---|---|---|---|
| 4,961,476 A | | 10/1990 | Witte et al. |
| 5,178,231 A | * | 1/1993 | Watanabe et al. ............ 180/248 |
| 5,403,074 A | * | 4/1995 | Van Zanten et al. .......... 303/169 |
| 6,047,231 A | * | 4/2000 | Rodrigues et al. ............ 701/69 |
| 6,353,399 B1 | * | 3/2002 | Prakash et al. ................ 341/10 |
| 8,041,492 B2 | * | 10/2011 | Young ............................ 701/93 |

FOREIGN PATENT DOCUMENTS

| | | |
|---|---|---|
| EP | 2236341 A1 | 10/2010 |
| JP | 2009-173261 | 8/2009 |

OTHER PUBLICATIONS

The extended European search report for corresponding European Patent Application No. 11171607.2, dated Oct. 20, 2011.

* cited by examiner

*Primary Examiner* — David M Fenstermacher
(74) *Attorney, Agent, or Firm* — Global IP Counselors, LLP

(57) ABSTRACT

A vehicle drive force distributing apparatus includes an irreversible transmission mechanism, an operating state determining component and a command value resolution switching component. The irreversible transmission mechanism prevents a radially oriented pressing force, generated between first and second rollers based on an inter-roller radial pressing force command value, from decreasing during a period while command value is constant to maintain the radially oriented pressing force at a prescribed value without operating an inter-roller radial pressing force generating source. The operating state determining component determines whether first or second vehicle operating states exists during which a first or a lower second precision level of drive force distribution control, respectively, is to occur between main and subordinate drive wheels. The command value resolution switching component provides the inter-roller radial pressing force command value at a constant value for a longer period during the second vehicle operating state.

20 Claims, 10 Drawing Sheets

VEHICLE DRIVE FORCE DISTRIBUTING APPARATUS

CROSS-REFERENCE TO RELATED APPLICATIONS

This application claims priority to Japanese Patent Application No. 2010-147112, filed on Jun. 29, 2010. The entire disclosure of Japanese Patent Application No. 2010-147112 is hereby incorporated herein by reference.

BACKGROUND

1. Field of the Invention

The present invention generally relates to a vehicle drive force distributing apparatus. More particularly, the present invention relates to a frictional transmission type vehicle drive force distributing apparatus that is capable of reducing energy consumption when distributing drive force between a main drive wheel and a subordinate drive wheel.

2. Background Information

A vehicle drive force distributing apparatus operates to distribute drive force between a main drive wheel and a subordinate drive wheel. For example, Japanese Laid-open Patent Publication No. 2009-173261 discloses an example of a conventional frictional transmission type drive force distributing apparatus. As shown, for example, in FIG. 5, the drive force distributing apparatus includes a first roller that is mechanically coupled to a main drive wheel, and a second roller that is mechanically coupled to a subordinate drive wheel. The apparatus operates to position the first roller and the second roller to make frictional contact with each other at their outer circumferential surfaces to redistribute a portion of a torque being transmitted to the main drive wheel from the main drive wheel to the subordinate drive wheel.

Accordingly, a torque transmission capacity between the rollers can be controlled by adjusting a radially oriented pressing force between the first roller and the second roller. The torque transmission capacity therefore controls the distribution of the drive force between the main drive wheel and the subordinate drive wheel.

In particular, the apparatus controls a motor or the like to turn a rotary shaft of the second roller about an eccentric axis such that the second roller is displaced in a radial direction with respect to the first roller. In this way, the apparatus adjusts the radial pressing force between the first roller and the second roller. Accordingly, the apparatus controls distribution of the drive force between the main drive wheel and the subordinate drive wheel.

SUMMARY

With the conventional drive force distributing apparatus mentioned above, it is necessary to continue operating the motor to maintain the radial pressing force between the rollers equal to the command value for the radial pressing force between the rollers even while the command value remains constant. Thus, even during a period when the command value for the radial pressing force between the rollers is a constant value, the motor will continuously consume electric power in order to maintain the radial pressing force between the rollers at the constant command value. This motor operation can incur a substantial energy loss.

Accordingly, an object of the present invention is to provide a drive force distributing apparatus that can eliminate or at least reduce energy loss.

In view of the state of the known technology, one aspect of the present disclosure is to provide a vehicle drive force distributing apparatus including an irreversible transmission mechanism, an operating state determining component and a command value resolution switching component. The irreversible transmission mechanism is configured to prevent a radially oriented pressing force, generated between a first roller and a second roller by an inter-roller radial pressing force generating source in response to an inter-roller radial pressing force command value, from decreasing during a period while the inter-roller radial pressing force command value is constant, such that the irreversible transmission mechanism maintains the radially oriented pressing force at a value prescribed by the inter-roller radial pressing force command value without operating the inter-roller radial pressing force generating source during the period while the inter-roller radial pressing force command value is constant. The first roller is mechanically coupled to a main drive wheel and the second roller is mechanically coupled to a subordinate drive wheel and configured to distribute a drive force to the subordinate drive wheel by frictionally contacting the first roller such that a drive force distribution between the main drive wheel and the subordinate drive wheel is based on the radially oriented pressing force. The operating state determining component is configured to determine whether a first vehicle operating state exists during which a first precision level of drive force distribution control is to be performed between the main drive wheel and the subordinate drive wheel or a second vehicle operating state exists during which a second precision level of drive force distribution control, less than the first precision level, is to be performed between the main drive wheel and the subordinate drive wheel. The command value resolution switching component is configured to provide the inter-roller radial pressing force command value to the inter-roller radial pressing force generating source when the operating state determining component determines that the second vehicle operating state exists, such that the period while the inter-roller radial pressing force command value is constant is longer when the second vehicle operating state exists than when the operating state determining component determines that the first vehicle operating state condition exists.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
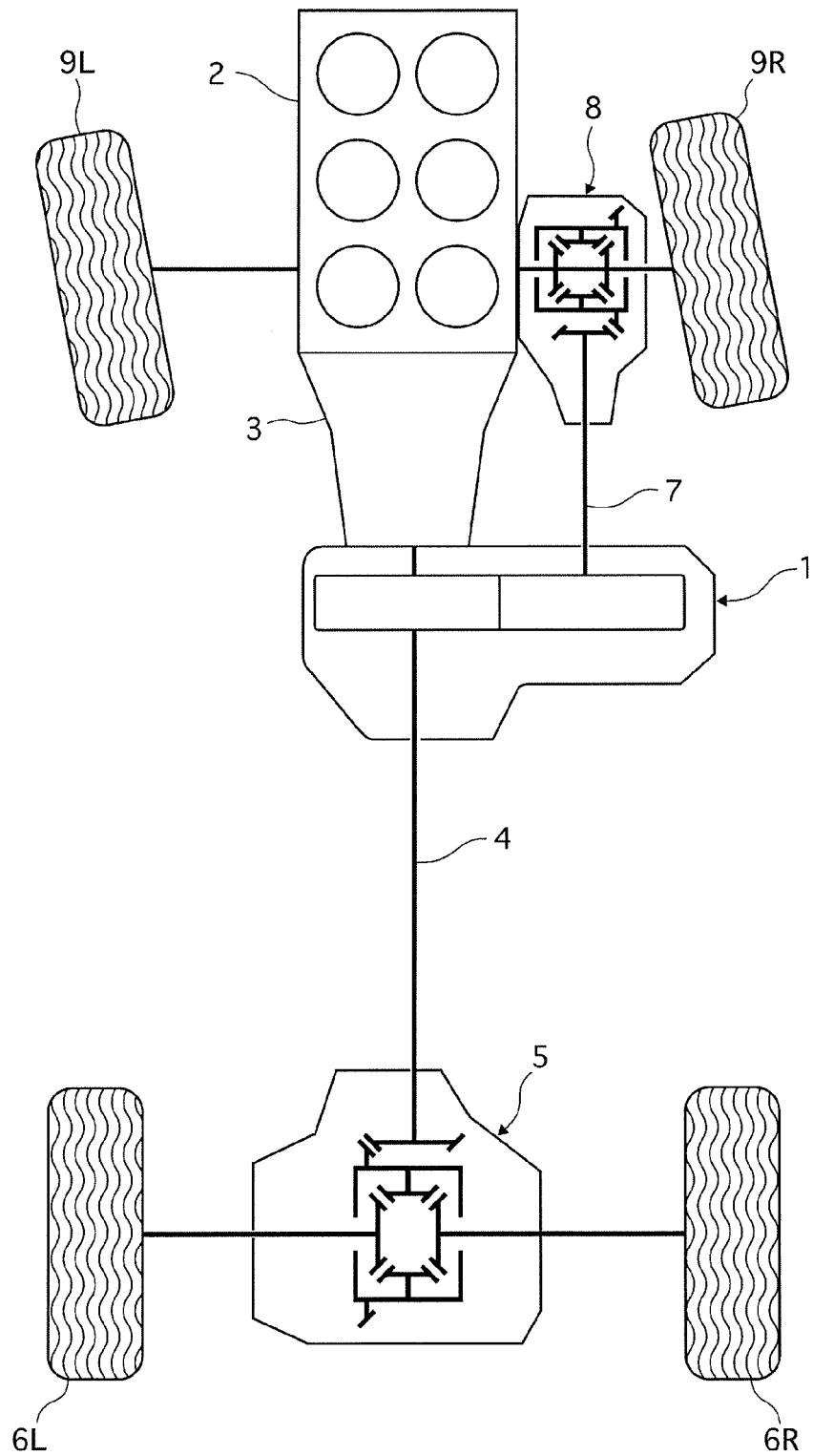
FIG. 1 is a schematic top plan view of an example of a power train of a four-wheel drive vehicle equipped with a drive force distributing apparatus according to a first disclosed embodiment.

FIG. 1 is a schematic top plan view of a power train of a four-wheel drive vehicle equipped with a drive force distributing apparatus 1 according to a first disclosed embodiment. In this embodiment, the drive force distributing apparatus 1 can operate as a transfer case. The four-wheel drive vehicle is based on a rear wheel drive configuration in which torque from an engine 2 is multiplied by a transmission 3 and is transferred through a rear propeller shaft 4 and a rear final drive unit 5 to left and right rear wheels 6L and 6R. The vehicle can operate in a four-wheel drive manner by using the drive force distributing apparatus 1 to divert a portion of the torque being provided to the left and right rear wheels (main drive wheels) 6L and 6R through a front propeller shaft 7 and a front final drive unit 8 to transmit torque to left and right front wheels (subordinate drive wheels) 7L and 7R.

The drive force distributing apparatus 1 thus determines a drive force distribution ratio between the left and right rear wheels (main drive wheels) 6L and 6R and the left and right front wheels (subordinate drive wheels) 9L and 9R. In this embodiment, the drive force distributing apparatus 1 can be configured as shown in FIG. 2.

Figure 2:
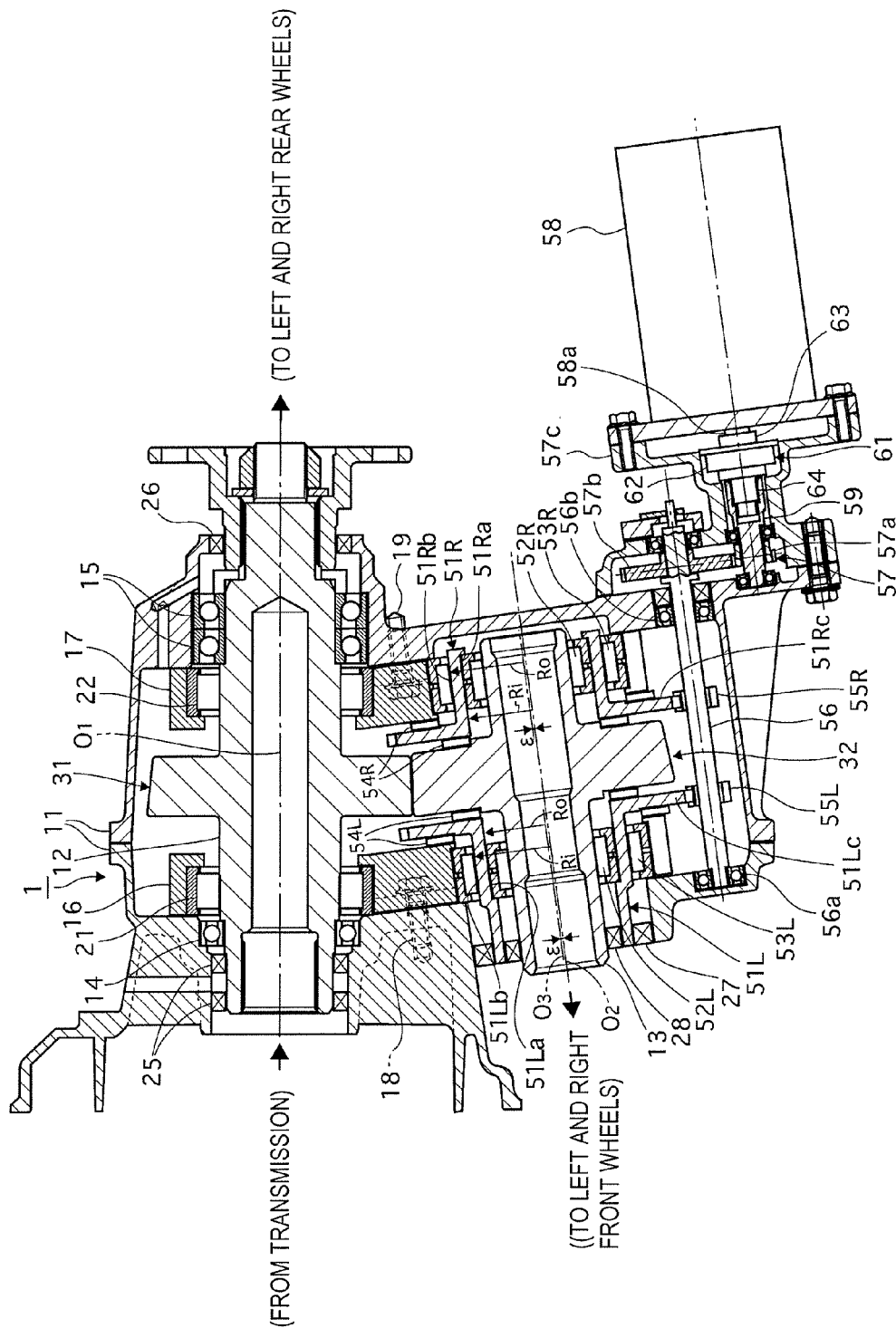
FIG. 2 is a vertical cross-sectional side view of the drive force distributing apparatus shown in FIG. 1.

That is, as shown in FIG. 2, the apparatus includes a housing 11. An input shaft 12 and an output shaft 13 are arranged to span across an inside of the housing 11 diagonally with respect to each other such that a rotational axis $O_1$ of the input shaft 12 and a rotational axis $O_2$ of the output shaft 13 intersect each other. The input shaft 12 is rotatably supported in the housing 11 on ball bearings 14 and 15 located at both ends of the input shaft 12. Furthermore, both ends of the input shaft 12 protrude from the housing 11 and are sealed in a liquid-tight fashion or a substantially liquid-tight fashion by seal rings 25 and 26. In this arrangement, one end of the input shaft 12 shown at the left side of FIG. 2 is coupled to an output shaft of the transmission 3 (see FIG. 1). Also, the other end of the input shaft 2 at the right side of FIG. 2 is coupled to the rear final drive unit 5 through the rear propeller shaft 4 (see FIG. 1).

In addition, a pair of bearing supports 16 and 17 are provided between the input shaft 12 and the output shaft 13 in positions near the ends of the input shaft 12 and the output shaft 13. The bearing supports 16 and 17 are fastened to axially opposite internal walls of the housing 11 with fastening members, such as bolts 18 and 19, at approximate middle portions of the bearing supports 16 and 17. Naturally, the fastening members need not be bolts 18 and 19, but can be any other suitable type of fastening members. Roller bearings 21 and 22 are arranged between the bearing supports 16 and 17 and the input shaft 12. As a result, the input shaft 12 can rotate freely or substantially freely with respect to the bearing supports 16 and 17. Also, the input shaft 12 is rotatably supported inside the housing 11 through the bearing supports 16 and 17 as well as the ball bearings 14 and 15.

A first roller 31 is formed integrally and coaxially with the input shaft 12 in an axially intermediate position located between the bearing supports 16 and 17, that is, between the roller bearings 21 and 22. A second roller 32 is formed integrally and coaxially with the output shaft 13 in an axially intermediate position such that the second roller 32 can make frictional contact with the first roller 31. Naturally, the first roller 31 can instead be attached to the input shaft 12 in any suitable manner instead of being integral with the input shaft 12. Likewise, the second roller 32 can instead be attached to the output shaft 13 in any suitable manner instead of being integral with the input shaft 12. The outer circumferential surfaces of the first roller 31 and the second roller 32 are conically tapered in accordance with the diagonal relationship of the input shaft 12 and the output shaft 13 such that the outer circumferential surfaces can contact each other without or substantially without a gap between the surfaces.

The output shaft 13 is rotatably supported with respect to the bearings supports 16 and 17 at positions near both ends of the output shaft 13. Thus, the output shaft 13 is rotatably supported inside the housing 11 through the bearing supports 16 and 17. A support structure used to support the output shaft 13 rotatably with respect to the bearing supports 16 and 17 will now be explained.

A further shown in FIG. 2, a crankshaft 51L configured as a hollow outer shaft is moveably fitted between the output shaft 13 and the bearing support 16. Also, a crankshaft 51R configured as a hollow outer shaft is moveably fitted between the output shaft 13 and the bearing support 17. The crankshaft 51L and the output shaft 13 protrude from the housing 11 as shown on the left side of FIG. 2. At the protruding portion, a seal ring 27 is installed between the housing 11 and the crankshaft 51L. Also, a seal ring 28 is installed between the crankshaft 51L and the output shaft 13. The seal rings 27 and 28 serve to seal the portions where the crankshaft 51L and the output shaft 13 protrude from the housing 11 in a liquid-tight or substantially liquid-tight fashion. The left end of the output shaft 13 protruding from the housing 11 in FIG. 2 is coupled to the front wheels 9L and 9R through the front propeller shaft 7 (see FIG. 1) and the front final drive unit 8.

A roller bearing 52L is arranged between a center hole 51La (radius Ri) of the crankshaft 51L and a corresponding end portion of the output shaft 13. Also, a roller bearing 52R is arranged between a center hole 51Ra (radius Ri) of the crankshaft 51R and a corresponding end portion of the output shaft 13. Thus, the output shaft 13 is supported such that the output shaft 13 can rotate freely about the center axis $O_2$ inside the center holes 51La and 51Ra of the crankshaft 51L and 51R.

Figure 3:
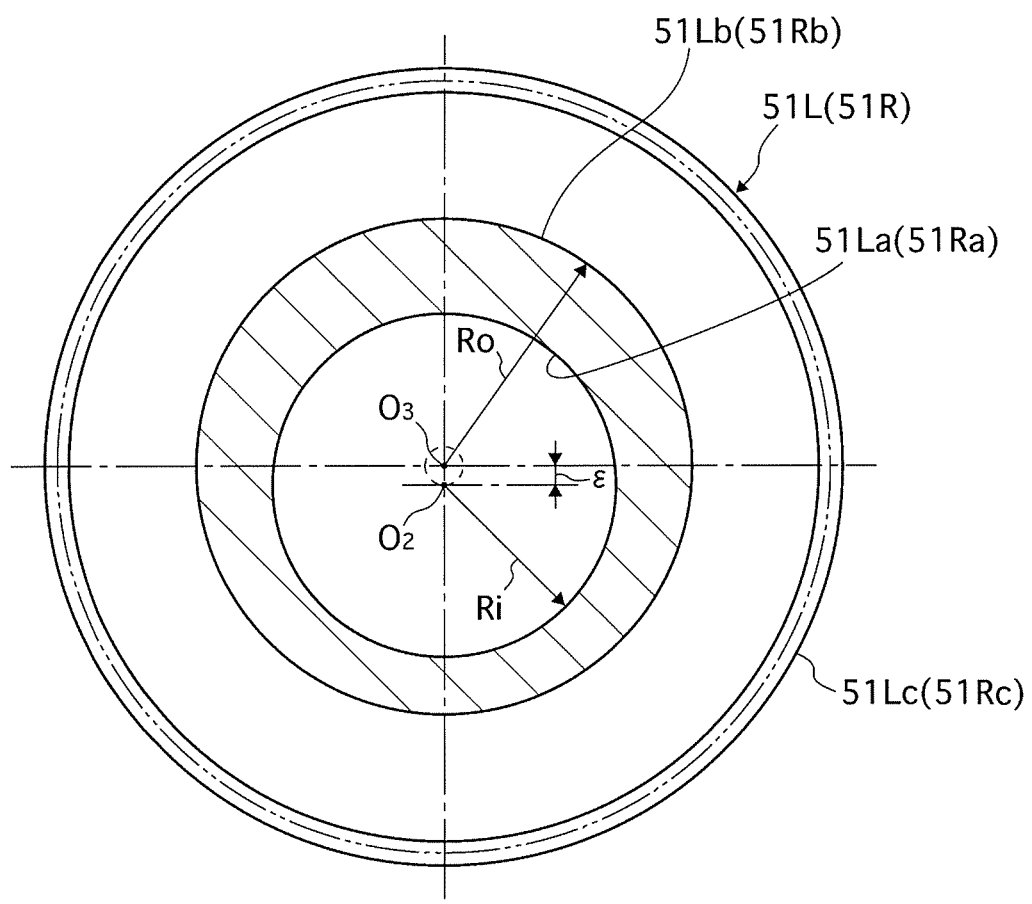
FIG. 3 is a vertical cross-sectional front view of an example of a crankshaft used in the drive force distributing apparatus.

As shown clearly in FIG. 3, the crankshaft 51L has an outer circumferential portion 51Lb (radius Ro) that is eccentric with respect to the center hole 51La. Also, the crankshaft 51R has an outer circumferential portion 51Rb (radius Ro) that is eccentric with respect to the center hole 51Ra. The eccentric outer circumferential portions 51Lb and 51Rb are offset from the center axis (rotational axis) $O_2$ of the center holes 51La and 51Ra by an eccentric amount E. The eccentric outer circumferential portion 51Lb of the crankshaft 51L is rotatably supported inside the corresponding bearing support 16 through a roller bearing 53L. The eccentric outer circumferential portion 51Rb of the crankshaft 51R is rotatably supported inside the corresponding bearing support 17 through a roller bearing 53R. The crankshafts 51L and 51R are positioned in an axial direction by the second roller 32 and by thrust bearings 54L and 54R.

A ring gear 51Lc is formed as an integral part of the crankshaft 51L. Also, a ring gear 51Rc is formed as an integral part of crankshaft 51R. Naturally, the ring gear 51Lc and the ring gear 51Rc can instead be attached to the crankshaft 51L and 51R, respectively. The ring gears 51Lc and 51Rc have the same or substantially the same configurations and are provided on the closely adjacent ends of the crankshaft 51L and 51R. The ring gear 51Lc meshes with a crankshaft drive pinion 55L, and the ring gear 51Rc meshes with a crankshaft drive pinion 55R. The crankshaft drive pinions 55L and 55R have the same or substantially the same configurations and are coupled to a common pinion shaft 56.

The ring gears 51Lc and 51Rc are meshed with the crankshaft drive pinions 55L and 55R such that the eccentric outer circumferential portions 51Lb and 51Rb of the crankshafts 51L and 51R are aligned with each other in a circumferential direction. That is, the rotational positions of the eccentric outer circumferential portions 51Lb and 51Rb are in phase with each other.

The pinion shaft 56 is rotatably supported with respect to the housing 11 by bearings 56a and 56b arranged at both ends of the pinion shaft 56. A right end of the pinion shaft 56 passes through the housing 11 as shown on the right-hand side of FIG. 2. An exposed end portion of the pinion shaft 56 is coupled to an output shaft 58a of an inter-roller radial pressing force control motor 58 (inter-roller radial pressing force generating source) through a reduction gearbox 57 comprising a small-diameter input gear 57a and a large diameter output gear 57b. Rotational position control can be executed with respect to the crankshafts 51L and 51R by driving the crankshafts 51L and 51R with the inter-roller radial pressing force control motor 58 through the pinions 55L and 55R and the ring gears 51Lc and 51Rc. When this occurs, the output shaft 13 and the rotational axis $O_2$ of the second roller 32 turn about the center axis (rotational axis) $O_3$ so as to revolve along a circular path indicated with a broken line in FIG. 3. Thus, a radial pressing force exerted against the first roller 31 by the second roller 32 can be controlled varying an axial distance between the rollers 31 and 32.

In this embodiment, an input shaft 59 of the reduction gearbox 57 on which the small-diameter input gear 57a is mounted does not connect directly to the output shaft 58a of the inter-roller radial pressing force control motor 58. Instead, the input shaft 59 is of the reduction gearbox 57 is coupled to the output shaft 58a of the inter-roller radial pressing force control motor 58 through a torque diode 61 that will now be explained in more detail.

The torque diode 61 serves as an irreversible transmission mechanism that functions to enable the operating force to be transmitted freely from the inter-roller radial pressing force control motor 58 (output shaft 58a) to the reduction gearbox 57 (input shaft 59) regardless of a direction of the rotational operating force from the inter-roller radial pressing force control motor 58 (output shaft 58a). Conversely, reverse transmission of a rotational force from the reduction gearbox 57 (input shaft 59) to the inter-roller radial pressing force control motor 58 (output shaft 58a) is prevented by a dual-direction rotational lock of the reduction gearbox 57 (input shaft 59).

Figure 4:
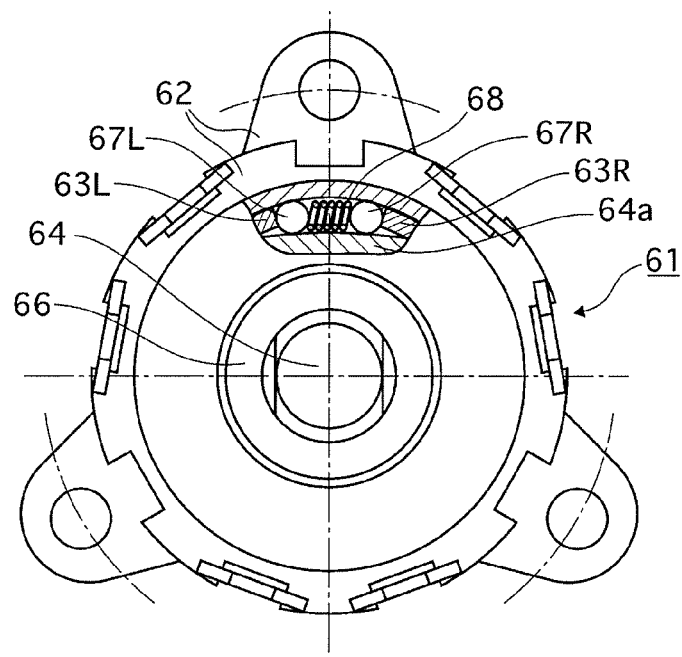
FIG. 4 is an end face view of a torque diode in the drive force distributing apparatus as viewed from an output shaft along an axial direction.
Figure 5:
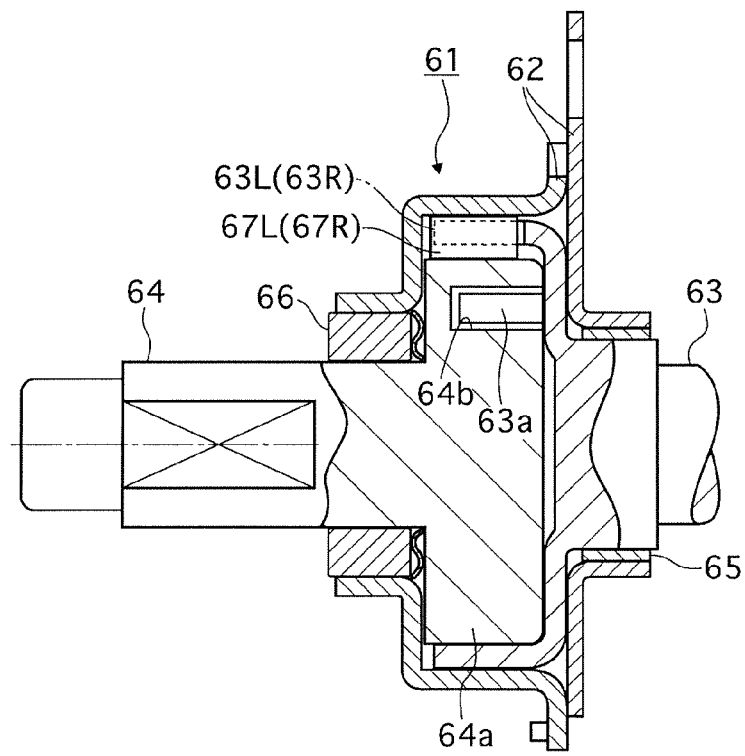
FIG. 5 is a vertical cross-sectional side view of the torque diode shown in FIG. 4.

As shown in FIG. 2, the torque diode 61 has a circular or substantially-circular disk-shaped case 62 that is mounted and fixed in a housing 57c of the reduction gearbox 57. As shown in FIGS. 4 and 5, an input shaft 63 is inserted axially into the mounting case 62 from one side. Also, an output shaft 64 is inserted axially into the mounting case 62 from the other side such that the input shaft 63 and the output shaft 64 are coaxial to each other. The input shaft 63 is rotationally supported with respect to the mounting case 62 by a bearing 65. The output shaft 64 is rotationally supported with respect to the mounting case 62 by a bearing 66.

As can be seen clearly in FIGS. 6A through 6C, an end portion of the output shaft 64 that is inserted into the mounting case 62 forms an enlarged end portion 64a that is hexagonal when viewed along an axial direction. A pair of locking rollers 67L and 67R are arranged between an outer flat surface forming each side of the hexagonal enlarged end portion 64a and an internal circumferential surface of the mounting case 62 such that an axial centerline of each of the rollers is parallel or substantially parallel to an axial centerline of the input shaft 63 and the output shaft 64.

As further shown in FIGS. 4 and 6A through 6C, a spring 68 is arranged between each pair of locking rollers 67L and 67R. The spring 68 serves to apply a force in a direction of separating the rollers 67L and 67R from each other. As a result, as shown in FIG. 4 and FIG. 6A, the locking rollers 67L and 67R are wedged into a circumferentially tapered gap between the outer flat surface of the hexagonal enlarged end portion 64a and the internal circumferential surface of the mounting case 62.

Roller holding pawls 63L and 63R are provided on the end portion of the input shaft 63 that is inserted into the mounting case 62 as shown in FIG. 4 and FIG. 6A. The roller holding pawls 63L and 63R are positioned where a minimum gap exists between each corner portion of the hexagonal enlarged end portion 64a and the internal circumferential surface of the mounting case 62. Thus, the roller holding pawls 63L and 63R serve as a roller holding device holding the pairs of locking rollers 67R and 67L from both sides along the direction in which the locking rollers 67R and 67L are arranged side by side. Under normal circumstances, a gap a exists between each of the roller holding pawls 63L and 63R and the adjacent roller 67L or 67R as shown in FIG. 6A.

A plurality of drive pins 63a are also provided on the end portion of the input shaft 63 that is inserted into the mounting case 62 as shown in FIG. 5 and FIG. 6A. The drive pins 63a protrude in an axial direction toward the hexagonal enlarged end portion 64a. Blind holes 64b are formed in an end face of the hexagonal enlarged portion 64a. The drive pins 63a fit loosely into the blind holes 64b with a prescribed gap β (β>α) in a radial direction.

As shown in FIG. 2, the case 62 of the torque diode 61 is fixed to the housing 57c of the reduction gearbox 57. Also, the input shaft 63 is coupled to the output shaft 58a of the inter-roller radial pressing force control motor 58, and the output shaft 64 is coupled to the input shaft 59 of the reduction gearbox 57. In this way, the torque diode 61 facilitates the drive force distributing apparatus 1.

Figure 6:
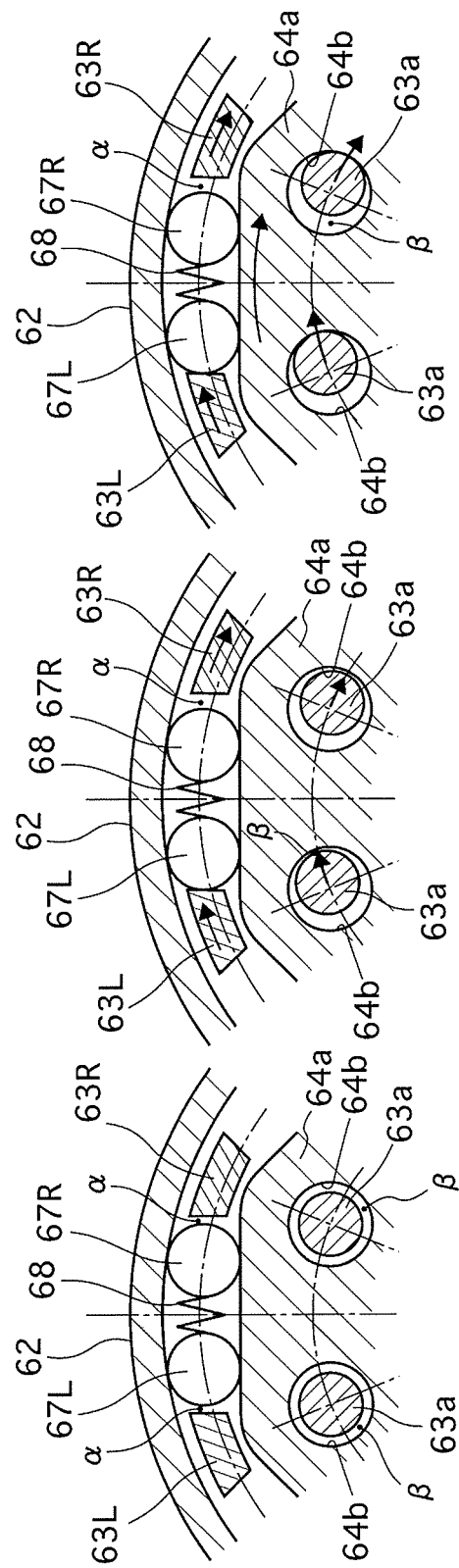
FIGS. 6A through 6C is a series of views illustrating an example of an operation of the torque diode, with FIG. 6A illustrating an example of an irreversible transmission action exhibited by the torque diode during a state in which an input torque for a drive force distribution control does not exist, FIG. 6B illustrating an example of a state that occurs immediately or soon after an input torque for the drive force distribution control is generated, and FIG. 6C illustrating an example of a state that occurs when the input torque for the drive force distribution control starts to be transmitted.

An example of the operational effect of the torque diode 61 will now be explained based on FIGS. 6A through 6C. FIG. 6A shows an example of a state in which the motor 58 shown in FIG. 2 is not operating and a torque is not imparted from the motor 58 to the input shaft 63. In this case, each of the roller holding pawls 63L and 63R of the input shaft 63 is in a neutral position separated from the adjacent roller 67L or 67R by a gap α. The drive pins 53a of the input shaft 63 are also in neutral positions in the blind holes 64b provided in the output shaft 64 (hexagonal enlarged end portion 64a). In this state, the output shaft 64 (hexagonal enlarged end portion 64a) is prevented from rotating when a reverse input is imparted from output shaft 64 (hexagonal enlarged end portion 64a). If the reverse input from the output shaft 64 (hexagonal enlarged end portion 64a) is a torque oriented in a clockwise direction from the perspective of FIG. 6A, then the roller 67L will become further wedged between the internal circumferential surface of the mounting case 62 and the corner of the hexagonal enlarged end portion 64a located behind the roller 67L relative to the direction of the torque. As a result, the output shaft 64 (hexagonal enlarged end portion 64a) will be prevented from rotating due to the reverse input. On the other hand, if the reverse input from the output shaft 64 (hexagonal enlarged end portion 64a) is a torque oriented in a counter-clockwise direction from the perspective of FIG. 6 (a), then the roller 67R will become further wedged between the internal circumferential surface of the mounting case 62 and the corner of the hexagonal enlarged end portion 64a located behind the roller 67R relative to the direction of the torque. As a result, the output shaft 64 (hexagonal enlarged end portion 64a) will be prevented from rotating due to the reverse input.

Consequently, when a torque is not imparted to the input shaft 63 because the motor 58 shown in FIG. 2 is not being operated, the output shaft 64 (hexagonal enlarged end section 64a) is not rotated by a reverse input in either of the directions mentioned above and can maintain its current rotational position. Thus, the crankshafts 51L and 51R can be held their current rotational positions. As a result of this irreversible transmission action, the radial pressing force (inter-roller torque transmission capacity) between the rollers 31 and 32 (i.e., the drive force distribution ratio) can be held in its current state. Conversely, when a torque is inputted to the input shaft 63 due to operation of the motor 58 shown in FIG. 2, the torque diode 61 can transmit the torque to the hexagonal enlarged end portion 64a (output shaft 64) such that the torque is directed to the drive force distribution control components.

The operation of the torque diode 61 will now be explained for a case in which a torque is imparted from the motor 58 to the input shaft 63 in the direction indicated with arrows in FIGS. 6B and 6C. After the roller holding pawl 63L located behind the roller 67L relative to the rotation direction of the input shaft 63 has rotated by an amount corresponding to the gap α, the roller holding pawl 63L strikes the roller 67L as shown in FIG. 6B. In doing so, the roller holding pawl 63L pushes the roller 67L toward the roller 67R against the spring force of the spring 68. As shown in FIG. 6C, this pushing by the roller holding pawl 63L displaces the roller 67L to a position where the space between the internal circumferential surface of the mounting case 62 and the corresponding outer flat surface of the hexagonal enlarged end section 64a is larger.

The displacement of the roller 67R releases the rotationally locked state of the hexagonal enlarged end portion 64a (output shaft 64) with respect to the mounting case 62. When the rotational lock is released, the drive pins 63a of the input shaft 63 rotate by an amount corresponding to the gap β and engage with the internal surfaces of the blind holes 64b as shown in FIG. 6C. The input shaft 63 imparts a torque to the hexagonal enlarged end portion 64a (output shaft 64) through the engagement of the drive pins 63a with the blind holes 64b. A pressing force (inter-roller torque transmission capacity) between the rollers 31 and 32 (i.e., a drive force distribution ratio) can be controlled as desired by adjusting the torque imparted from the motor 58 to the input shaft 63.

The torque diode 61 operates in a similar fashion when a torque is transmitted from the motor 58 to the input shaft 63 in the opposite direction of the arrows shown in FIGS. 6B and 6C. After the roller holding pawl 63R located behind the roller 67R relative to the rotation direction of the input shaft 63 has rotated by an amount corresponding to the gap α, the roller holding pawl 63R strikes the roller 67R and pushes/moves the roller 67R so that the locked state is released. The drive pins 63a of the input shaft 63 engage with the internal surfaces of the blind holes 64b and impart a torque to the hexagonal enlarged end portion 64a (output shaft 64). As a result, a radial pressing force (inter-roller torque transmission capacity) between the rollers 31 and 32 (i.e., a drive force distribution ratio) can be controlled as desired by adjusting the torque imparted from the motor 58 to the input shaft 63.

Figure 7:
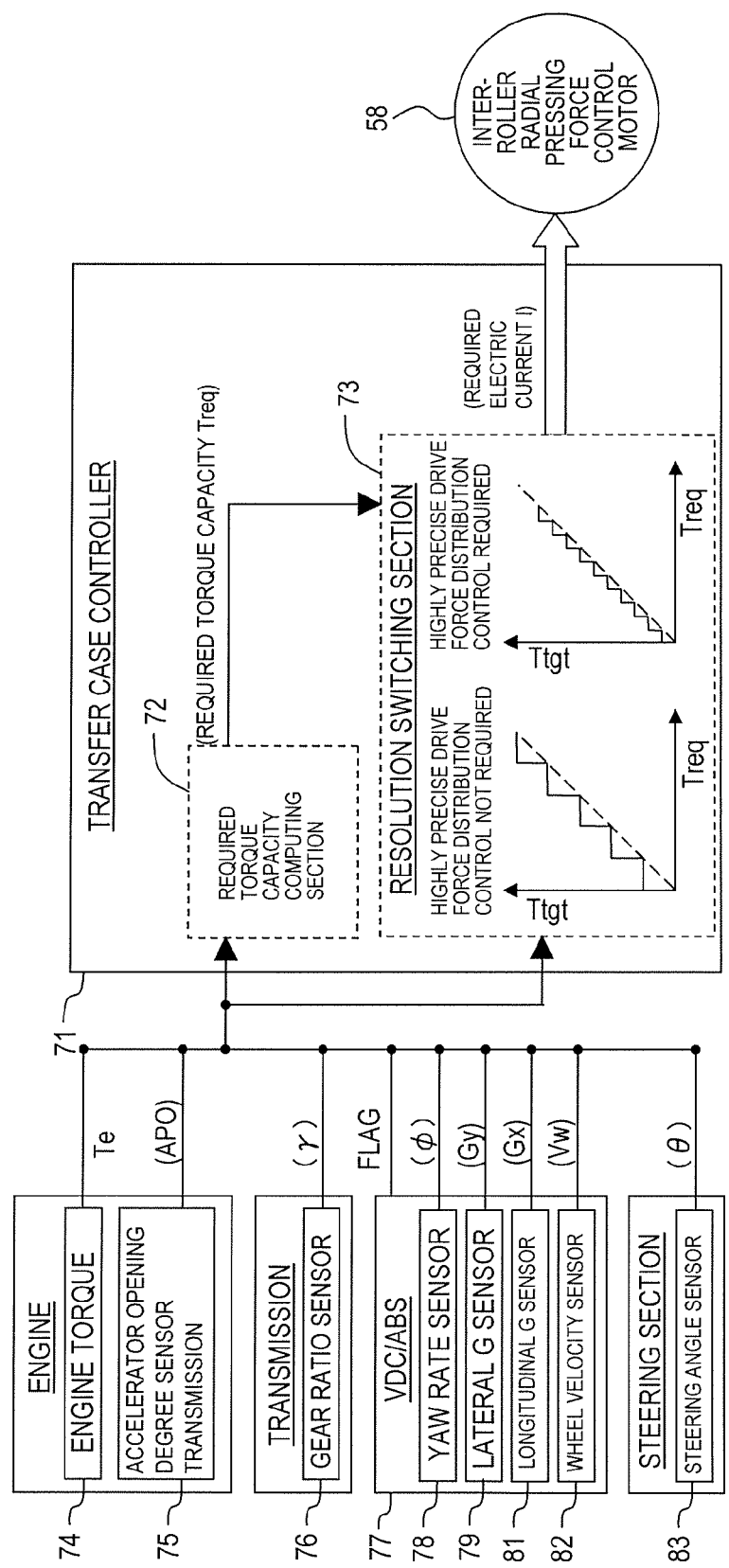
FIG. 7 is a control system diagram showing an example of the drive force distribution control system employing an inter-roller radial pressing force control motor as shown in FIG. 2.

FIG. 7 shows an example of a drive force distribution control system including the inter-roller radial pressing force control motor 58 and having a transfer case controller 71 as a main component part. The transfer case controller 71 comprises a required torque capacity computing section 72 and a resolution switching section 73.

As understood in the art, the transfer case controller 71 preferably includes a microcomputer with a control program that can operate as the required torque capacity computing section 72 and the resolution switching section 73 and control the operations as discussed herein. Naturally, the required torque capacity computing section 72 and the resolution switching section 73 can be configured in separate microcomputers. The transfer case controller 71 can also include other conventional components such as an input interface circuit, an output interface circuit, and storage devices such as a ROM (Read Only Memory) device and a RAM (Random Access Memory) device. The microcomputer of the transfer case controller 71 is programmed to control the transfer case controller 71. The memory circuit stores processing results and control programs that are run by the processor circuit. The transfer case controller 71 is operatively coupled to the components shown in FIG. 7 in a conventional manner. The internal RAM of the transfer case controller 71 stores statuses of operational flags and various control data. The internal ROM of the transfer case controller 71 stores the programming for various operations. The transfer case controller 71 is capable of selectively controlling any of the components discussed herein in accordance with the control program. It will be apparent to those skilled in the art from this disclosure that the precise structure and algorithms for the transfer case controller 71 can be any combination of hardware and software that will carry out the functions of the present invention.

Furthermore, the components of the transfer case controller 71 can be conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the embodiments discussed herein.

The required torque capacity computing section 72 computes a required torque capacity Treq that needs to be generated between the first roller 31 and the second roller 32. The resolution switching section 73 switches a resolution used when computing a required electric current I that needs to be supplied to the inter-roller radial pressing force control motor 58 in order to achieve the required torque capacity Treq.

The transfer case controller 71 receives a signal from an engine torque computing section 74 that is operable to compute an output torque Te of the engine 2. The transfer case controller 71 also receives a signal from an accelerator opening degree sensor 75 that operates to detect an accelerator pedal opening APO (accelerator pedal depression amount) of the engine 2. The transfer case controller 71 further receives a signal from a gear ratio sensor 76 contrived to detect a selected gear ratio γ of the transmission 3. In addition, the transfer case controller 71 receives a VDC flag indicating whether a vehicle dynamic control (VDC) is being executed and an ABS flag indicating if an anti-lock brake system (ABS) is operating from a VDC/ABS system 77. The transfer case controller 71 also receives signals from a yaw rate sensor 78 indicating a yaw rate Φ, signals from a lateral G sensor 79 indicating a later acceleration Gy, and signals from a longitudinal G sensor 81 indicating a longitudinal acceleration Gx. Moreover, the transfer case controller 71 receives signals from a wheel speed sensor 82 indicating a wheel speed Vw for the VDC and the ABS, and signals from a steering angle sensor 83 the operates to detect a steering angle θ.

Figure 8:
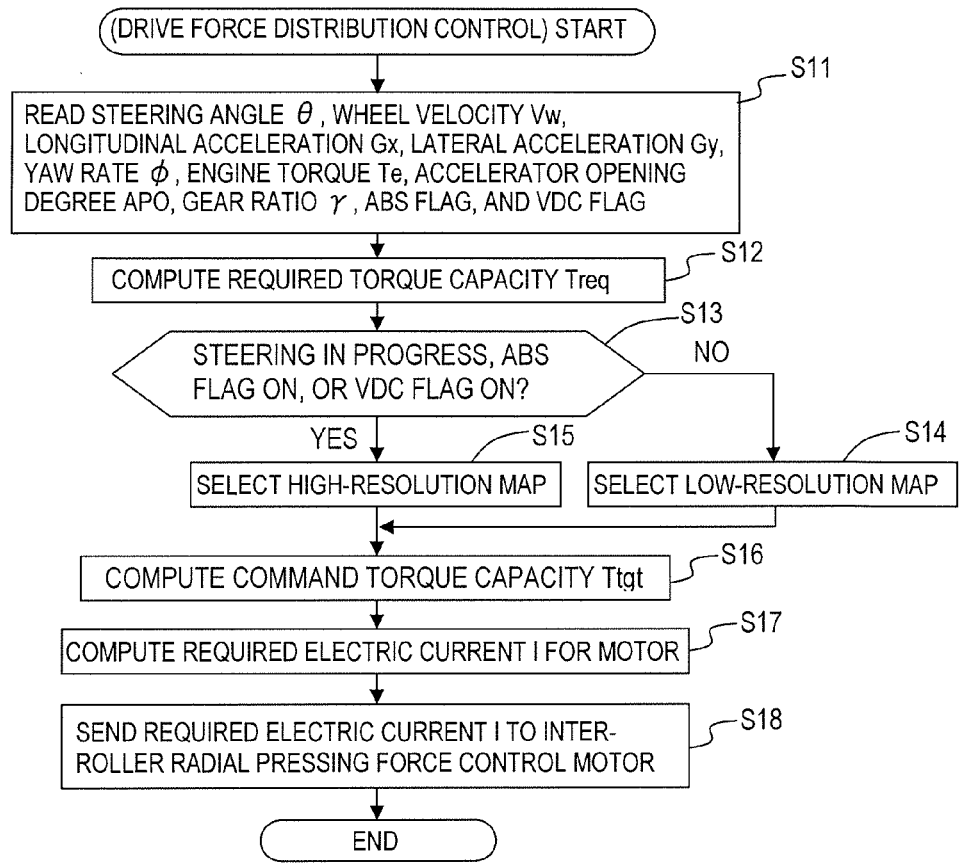
FIG. 8 is a flowchart showing an example of a drive force distribution control program executed by a transfer case controller of the drive force distribution control system shown in FIG. 7.

In this example, the transfer case controller 71 comprising the required torque capacity computing section 72 and the resolution switching section 73 executes a control program shown in FIG. 8 based on information obtained from the aforementioned input signals and computes a required electric current I to be supplied to the inter-roller radial pressing force control motor 58. In step S11, the transfer case controller 71 reads in a steering angle θ, a wheel speed Vw, a longitudinal acceleration Gx, a lateral acceleration Gy, a yaw rate Φ, an engine torque Te, an accelerator pedal opening APO, a transmission gear ratio γ, the ABS flag, and the VDC flag.

In step S12, the transfer case controller 71 computes a required torque capacity Treq to be generated between the first roller 31 and the second roller 32. In the computation, the required torque capacity computing section 72 shown in FIG. 7 operates to, for example, separate a main drive wheel speed related to the left and right rear wheels 6L and 6R (main drive wheels) and a subordinate drive wheel speed related to the left and right front wheels 9L and 9R (subordinate drive wheels) from among the vehicle speeds Vw. The required torque capacity computing section 72 thus compares the main drive wheel speed to the subordinate drive wheel speed so as to check a drive slip state of the main drive wheels 6L and 6R each control cycle. The required torque capacity computing section 72 calculates a target drive force distribution ratio required to keep slippage of the main wheels within an allowable range based on the engine torque Te, the accelerator pedal opening APO, and the transmission gear ratio α. The required torque capacity computing section 72 then calculates a torque transmission capacity to be generated between the first roller 31 and the second roller 32 in order to achieve the target drive force distribution ratio. The calculated torque transmission capacity is set as a required inter-roller torque capacity Treq which can also be referred to as a required inter-roller radial pressing force value.

The required torque capacity Treq is not used in this form for drive control of the inter-roller radial pressing force control motor 58. Instead, the resolution switching section 73 converts the required torque capacity Treq into a command torque capacity Ttgt, which can also be referred to as the inter-roller radial pressing force command value. The command torque capacity Ttgt is thus used for the drive control of the inter-roller radial pressing force command motor 58. That is, in step S13, the resolution switching section 73 determines if any of the wheels 6L, 6R, 9L, and 9R is being steered based on the steering angle θ, the yaw rate Φ, the lateral acceleration Gy, and the longitudinal acceleration Gx. The resolution switching section 73 also determines if the ABS flag or the VDC flag is on. In other words, the resolution switching section 73 determines if the automatic braking system is operating or if vehicle dynamic control is being executed.

If the resolution switching section 73 determines in step S13 that none of the wheels 6L, 6R, 9L, 9R is being steered (the vehicle is traveling straight) and that the ABS flag and the VDC flag is off (ABS not operating and VDC not being executed), then the resolution switching section 73 processing proceeds to step S14. In step S14, the resolution switching section 73 selects a low resolution map tailored for situations (a second vehicle operating state) in which a high-resolution drive force distribution control is not required (a second precision level of drive force distribution control). An example of such a map is shown with a solid line in FIG. 9A. Then, in step S16, the resolution switching section 73 uses the low resolution map to find a command torque capacity Ttgt based on the required torque capacity Treq.

In step S17, the resolution switching section 73 computes a required motor electric current I that is to be supplied. That is, required motor electric current I should have a value that provides an inter-roller radial pressing force command value which enables the torque transmission capacity between the first roller 31 and the second roller 32 to be equal to the command torque capacity Ttgt. Then, in step S18, the resolution switching section 73 sends the required motor electric current Ito the inter-roller radial pressing force control motor 58.

However, if the resolution switching section 73 determines in step S13 that a wheel among the wheels 6L, 6R, 9L, 9R is being steered or that the ABS flag or the VDC flag is on (ABS is being operated or VDC is being executed), then the resolution switching section 73 processing proceeds to step S15. In step S15, the resolution switching section 73 selects a high-resolution map tailored for situations (a first vehicle operating state) in which a high-resolution drive force distribution control (a first precision level of drive force distribution control) is required. An example of such a map is shown with a solid line in FIG. 9B. In step S16, the resolution switching section 73 uses the high resolution map to find a command torque capacity Ttgt based on the required torque capacity Treq. In step S17, the resolution switching section 73 computes a required motor electric current I that is to be supplied. As discussed above, required motor electric current I should have a value that provides an inter-roller radial pressing force command value which enables the torque transmission capacity between the first roller 31 and the second roller 32 to be equal to the command torque capacity Ttgt. Then, in step S18, the resolution switching section 73 sends the required motor electric current I to the inter-roller radial pressing force control motor 58. Accordingly, as can be appreciated from the above, the resolution switching section 73, for example, can also be referred to as an operating state determining component and a command value resolution switching component. Naturally, the operations discussed above can be performed by other components of the transfer case controller 71 or by any other suitable component.

Figures 9A, 9B:
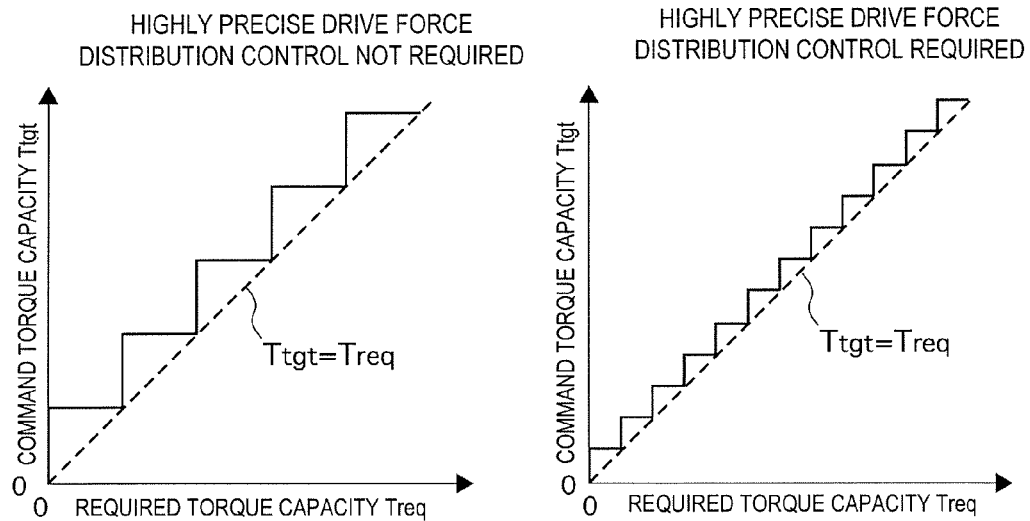
FIGS. 9A and 9B illustrate examples characteristic curves used as maps when a command torque capacity is found by the control program, with FIG. 9A representing an example of a low-resolution command torque capacity characteristic used during operation that does not require a highly precise drive force distribution control, and FIG. 9B representing an example of a high-resolution command torque capacity characteristic used during operation that requires a highly precise drive force distribution control.

It should be noted that the high resolution map exemplified with a solid line in FIG. 9B is established for situations in which a high-resolution drive force distribution control is required. Thus, the high resolution map approximates using the required torque capacity Treq found in step S12 directly as the command torque capacity Ttgt, which is advantageous in satisfying the need for a high-resolution drive force distribution control. Moreover, using the required torque capacity Treq found in step S12 directly (as is) as the command torque capacity Ttgt in step S16 eliminates the need for a high-resolution map such as that shown in FIG. 9B for high-resolution drive force distribution control. Thus, the elimination of such a map can reduce the memory capacity of the apparatus.

As can be understood from the above, the low-resolution map in FIG. 9A and the high-resolution map in FIG. 9B are both preferably established in advance such that the command torque capacity Ttgt corresponding to any given required torque capacity Treq is positioned in a region above the broken line Ttgt=Treq. That is, the command torque capacity Ttgt is always equal to or larger than the required torque capacity Treq. This can avoid a situation in which the actual torque transmission capacity achieved by the inter-roller radial pressing force control motor 58 in accordance with the required electric current value I corresponding to the command torque capacity Ttgt becomes smaller than the required torque capacity Treq. Thus, slippage between the rollers 31 and 32 can be avoided, and the disruption of the ability of the apparatus to provide the intended drive force distribution control can also be prevented.

An example of the process performed in step S17 to compute the motor electric current value I which achieves an inter-roller radial pressing force command value that enables the torque transmission capacity between the first roller 31 and the second roller 32 to be equal to the command torque capacity Ttgt will now be explained. During a period when the command torque capacity Ttgt is a constant value and does not change or substantially does not change with respect to the required torque capacity Treq, the torque diode 61 functions as explained above. Thus, the torque diode 61 enables the inter-roller radial force pressing command value to be maintained. By doing this, the torque transmission capacity between the first roller 31 and the second roller 32 can be maintained at the command torque capacity Ttgt even if the required motor electric current I fall to 0 and the inter-roller radial pressing force control motor 58 enters a non-operating state. Moreover, this torque transmission capacity can be maintained for the conditions illustrated in FIGS. 9A and 9B. As a result, after the torque transmission capacity between the rollers has reached the command torque capacity Ttgt, the required motor torque electric current value I can be set to 0 as long as the command torque capacity is a constant or substantially constant value. Accordingly, the inter-roller radial pressing force control motor 58 can be in a non-operating state, and electric power consumption is reduced.

Furthermore, from the perspective of electric power consumption, the low-resolution map in FIG. 9A may be more advantageous than the high-resolution map in FIG. 9B. That is, the low-resolution map is arranged to hold the command torque capacity Ttgt at a constant value that does not change or substantially does not change with respect to the required torque capacity Treq for a longer period of time. Consequently, the inter-roller radial pressing force control motor 58 can be maintained in a non-operating state by setting the required motor electric current value I to 0 for a longer period of time.

However, since the command torque capacity Ttgt is always equal to or larger than the required torque capacity Treq, the low-resolution map in FIG. 9A has a stronger tendency than the high-resolution map in FIG. 9B for the torque transmission capacity between the rollers to be larger than the required torque capacity Treq. Thus, the low-resolution map has a stronger tendency for the operation to be closer to a rigid four-wheel drive state. Consequently, use of the high-resolution map may be desirable during steering, ABS operation, VDC execution, and other operating states requiring a high-resolution drive force distribution control to minimize a tight corner brake phenomenon. The use of the high-resolution map can thus avoid an increase in the turning radius, and can perform the drive force distribution control used in the ABS or VDC to accomplish a prescribed wheel antilock braking function or a prescribed vehicle behavior control function. In other words, during steering, ABS operation, VDC execution, and other operating states requiring a high-resolution drive force distribution control, the high-resolution map can be used to find the command torque capacity Ttgt. Thus, the torque transmission capacity between the rollers can be prevented from being much larger than the required torque capacity Treq. This can thus prevent the operation from being similar to a rigid four-wheel drive state.

Conversely, during an operating state in which a high-resolution drive force distribution control is not necessary, such as when the vehicle is traveling straight and neither ABS nor VDC is in progress, there is little concern about performing a prescribed wheel antilock braking function or a prescribed vehicle behavior control function as discussed above. Accordingly, a wheel antilock braking function or a prescribed vehicle behavior control function will likely not occur even if a state similar to a rigid four-wheel drive state exists. Therefore, from the perspective of reducing the amount of electric power consumed by the motor 58, it is preferable to use the low-resolution map to determine the command torque capacity Ttgt.

As can further be appreciated from the above, an output torque from the transmission 3 shown in FIG. 1 is imparted to the left end of the shaft 12 shown in FIG. 2. The torque can be transmitted directly from the input shaft 12 to the left and right rear wheels 6L and 6R (main drive wheels) through the rear propeller shaft 4 and the rear final drive unit 5. Also, the drive force distributing apparatus 1 can divert a portion of the torque from the left and right rear wheels 6L and 6R toward the output shaft 13 by passing torque from the first roller 31 to the second roller 32. A torque reaching the output shaft 13 is transmitted from the left end of the output shaft 13 shown in FIG. 2 to the left and right front wheels (subordinate drive wheels) 7L and 7R. Specifically, the torque is transmitted from the output shaft 13 through the front propeller shaft 7 and the front final drive unit 8 to the left and right front wheels (subordinate drive wheels) 7L and 7R as shown in FIG. 1. Therefore, the vehicle can be operated in a four-wheel drive manner in which the left and right rear wheels 6L and 6R (main drive wheels) and the left and right front wheels (subordinate drive wheels) 7L and 7R are driven.

When the vehicle is traveling in four-wheel drive, the inter-roller radial pressing force control motor 58 can perform drive force distribution control to control a drive force distribution between the left and right rear wheels 6L and 6R and the left and right front wheels 7L and 7R. Rotation of the inter-roller radial pressing force control motor 58 is transferred to the crank shafts 51L and 51R through the torque diode 61, the reduction gearbox 57, the pinions 55L and 55R, and the ring gears 51Lc, and 51Rc.

Furthermore, the inter-roller radial pressing force control motor 58 can control a rotational positioning of the crankshafts 51L and 51R and thereby cause a rotational axis $O_2$ of the output shaft 13 and the second roller 32 to revolve along a circular path as indicated with a broken line in FIG. 3. Thus, the motor 58 can vary a distance between the rotational axes of the rollers 31 and 32, and thereby control a radial pressing force of the second roller 32 against the first roller 31. In doing so, the motor 58 can control a torque transmission capacity between the rollers 31 and 32, and thus control the drive force distribution between the front and rear wheels, in accordance with a calculation result obtained through the process shown in FIG. 8.

Furthermore, rotation of the inter-roller radial pressing force control motor 58 is transmitted to the reduction gearbox 57 through the torque diode 61. Thus, the irreversible transmission action of the torque diode 61 enables the torque transfer capacity between the rollers 31 and 32 (inter-roller radial pressing force) to be maintained at the command torque capacity Ttgt (inter-roller radial pressing force command value) without operating the inter-roller radial pressing force control motor 58 during a period when the command value Ttgt is unchanging or substantially unchanging. As a result, the inter-roller radial pressing force control motor 58 need not operate while the drive force distribution control is in progress. Accordingly, a time during which the energy consumed in order to accomplished the drive force distribution control can be reduced to 0. Hence, the amount of energy lost during the drive force distribution control can be reduced.

In addition, when an operating state exists which does not require highly precise drive force distribution control, a low-resolution command torque capacity Ttgt map can be used to control the operation of the inter-roller radial pressing force control motor 58. Therefore, when the vehicle is traveling straight and neither ABS operation nor VDC execution is in progress, for example, the low-resolution command torque capacity Ttgt map 1 can be used to control the operation of the inter-roller radial pressing force control motor 58. Such a low resolution map has periods of time during which the command torque capacity Ttgt is a constant value that are longer than corresponding time period of a high-resolution map. As a result, when an operating state exists which does not require a highly precise drive force distribution control, the amount of time during which the command torque capacity Ttgt is a constant value or a substantially constant value can be longer. Accordingly, the amount of time during which the inter-roller radial pressing force control motor 58 is not operating can be longer. Thus, the period during which energy consumed during drive force distribution control can be reduced to zero is longer. As a result, energy loss during drive force distribution control can be reduced.

As can further be appreciated from the above, low-resolution command torque capacity Ttgt for the drive force distribution control as exemplified in FIG. 9A can be used if the vehicle is in an operating state that does not require a highly precise drive force distribution control. Conversely, when the vehicle is in an operating state that requires a highly precise drive force distribution control, the high-resolution command torque capacity Ttgt exemplified in FIG. 9B is used instead. As a result, a highly precise drive force distribution control can be accomplished as expected without sacrificing precision. Thus, an amount of time during which the energy consumed by the drive force distribution control can be set to zero can be made as long as possible without adversely affecting the drive force distribution control. Moreover, an energy loss incurred during the drive force distribution control can be reduced without affecting the drive force distribution control. As a result, a large energy loss can be reliably eliminated.

Also, the low-resolution command torque capacity Ttgt (inter-roller radial pressing force command value) and the high-resolution command torque capacity Ttgt (inter-roller radial pressing force command value) are determined in advance with respect to a required torque capacity Treq between the first roller 31 and the second roller 32 (required inter-roller radial pressing force value). The determined values are thus mapped as shown, for example, in FIGS. 9A and 9B. Hence, a low-resolution command torque capacity Ttgt is determined using the map shown in FIG. 9A when an operating state exists which does not require highly precise drive force distribution control. Conversely, a high-resolution command torque capacity Ttgt is determined based on the required inter-roller torque capacity Ttgt using the map shown in FIG. 9B when an operating state exists for which highly precise drive force distribution control is preferred. Although a larger memory capacity may be needed for the maps, the processing load required for computing the command torque capacity Ttgt is small and a high-performance, high-priced computing system is not necessary. Thus, the overall cost of the apparatus can be reduced.

Furthermore, the inter-roller required torque capacity Treq itself can be set as the command torque capacity Ttgt without using a high-resolution command torque capacity map when an operating condition exists which requires a highly precise drive force distribution control. Thus, the need for highly precise drive force distribution control can be satisfied, and the memory capacity can be reduced, because a high-resolution map like that exemplified in FIG. 9B will not be needed for the highly precise drive force distribution control.

In addition, as shown in FIGS. 9A and 9B, the low-resolution command torque capacity Ttgt and the high-resolution command torque capacity Ttgt are set to always be equal to or larger than the inter-roller required torque capacity Ttgt. Thus, the actual torque transmission capacity generated between the rollers 31 and 32 by the inter-roller radial pressing force control motor 58 would not become smaller than the required torque capacity Treq. As a result, slippage between the rollers 31 and 32, and a corresponding disruption in the intended drive force distribution control, can be avoided.

Additional disclosed embodiments will now be explained. In view of the similarity between the first embodiment and the embodiments discussed below, the parts of the embodiments discussed below that are identical to the parts of the first embodiment will be given the same reference numerals as the parts of the first embodiment. Moreover, the descriptions of the parts of the embodiments discussed below that are identical to the parts of the first embodiment may be omitted for the sake of brevity.

Figure 10:
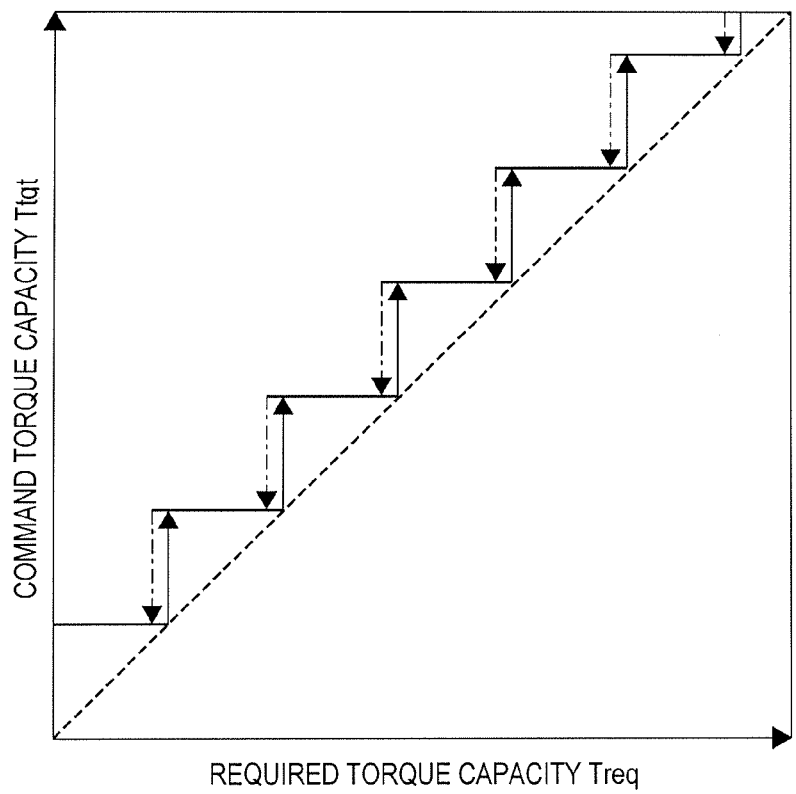
FIG. 10 illustrates an example of a low-resolution command torque capacity characteristic used during drive force distribution control of a drive force distributing apparatus according to a second disclosed embodiment.

In a second disclosed embodiment, a low-resolution command torque capacity Ttgt such as that shown in FIG. 10 can be used instead of the low-resolution command torque Ttgt exemplified in FIG. 9A. Although the solid-line characteristic curve shown in FIG. 10 is same or basically the same as the solid-line characteristic shown in FIG. 9A, the low-resolution command torque capacity Ttgt in FIG. 10 is assumed to rise one step at a time. Also, when the low-resolution command torque capacity Ttgt decreases one step at a time, the decreasing occurs at smaller required torque capacities Treq than during rising. This is shown as the single-dot chain lines in FIG. 10. Accordingly, a hysteresis is established between increases of the command torque capacity Ttgt and decreases of the command torque capacity Ttgt.

As shown in FIG. 9A, certain required torque capacity Treq values are equal to corresponding values of the low-resolution command torque capacity Ttgt regardless of whether the command torque capacity Ttgt increases or decreases. Consequently, if the required torque capacity Treq changes in an oscillatory manner in a vicinity of a value where the command torque capacity Ttgt changes, then the command torque capacity Ttgt may increase and decrease frequently due to a hunting phenomenon. This frequent increase and decrease may affect the drive force distribution control. Furthermore, since the inter-roller radial pressing force control motor 58 operates each time the command torque capacity Ttgt changes, frequent changing of the command torque capacity Ttgt may increase electric power consumption.

However, in the second embodiment, a hysteresis is established such that the values of the required torque capacity Treq where the command torque capacity Ttgt increases are different from the values where the command torque capacity Ttgt decreases. Hence, the command torque capacity Ttgt will not increase and decrease frequently due to a hunting phenomenon even if the required torque capacity Treq varies in an oscillatory manner so long as the variation is within the hysteresis range. Consequently, when the required torque capacity Treq fluctuates within the hysteresis range, the inter-roller radial pressing force control motor 58 does not operate and can be maintained in a non-operating state. As a result, electric power consumption can be reduced during an operating state exists that does not require highly precise drive force distribution control.

In a third disclosed embodiment, the high-resolution command torque capacity Ttgt is set to the same or substantially the same value as the torque capacity Treq required between the first roller 31 and the second roller 32. Furthermore, a relationship of the low-resolution command torque capacity Ttgt with respect to the required torque capacity Treq between the first roller 31 and the second roller 32 is not determined in advance and prepared as a map as shown in FIGS. 9A, 9B and 10. Instead, the low-resolution command torque capacity Ttgt is computed in an ongoing manner based on the required torque capacity Treq between the first roller 31 and the second roller 32 as shown in FIG. 11.

That is, the low-resolution command torque capacity Ttgt is increased from 0 by one step to an initial value at a time t1 when the required torque capacity Treq starts rising. Thereafter, the low-resolution command torque capacity Ttgt is controlled based on an increase reference value (Ttgt+A) that is larger than a current low-resolution command torque capacity Ttgt by an amount equal to an increase dead band width A. The low-resolution command torque capacity Ttgt is further controlled based on a decrease reference value (Ttgt−B) that is smaller than the current low-resolution command torque capacity Ttgt by an amount equal to a decrease dead band width B (=A). The low-resolution command torque capacity Ttgt is increased by one step at time t2 when the required torque capacity Treq becomes equal to or larger than the increase reference value (Ttgt+A). Also, the low-resolution command torque capacity Ttgt is decreased by one step when the required torque capacity Treq becomes equal to or smaller than the decrease reference value (Ttgt−B) (not shown in FIG. 11).

Figure 11:
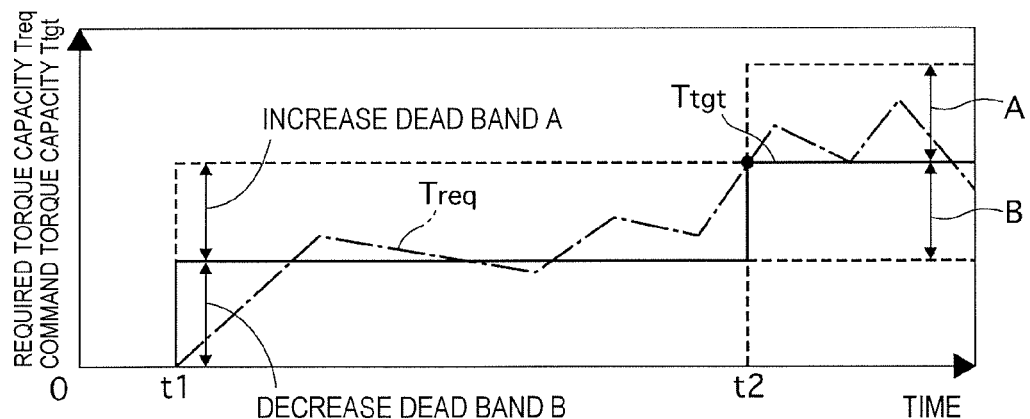
FIG. 11 illustrates an example of a time variation characteristic of a low-resolution command torque capacity during a drive force distribution control of a drive force distributing apparatus according to a third disclosed embodiment.

Accordingly, the low-resolution command torque capacity Ttgt as shown in FIG. 11 can be used when an operating condition exists that does not required highly precise drive force distribution control. Thus, the low-resolution command torque capacity Ttgt remains at a constant value for long periods of time. As with the first and second embodiments, an amount of time during which the inter-roller radial pressing force control motor 58 can be put into a non-operating state and the energy consumed by the motor 58 can be set to zero is lengthened. Thus, energy loss incurred during the drive force distribution control can be reduced without adversely affecting the drive force distribution control. As a result, a large energy loss during a drive force distribution control can be reliably prevented.

Additionally, in this embodiment, it is not necessary to provide a memory capacity for maps. Rather, the low-resolution command torque capacity Ttgt is increased by one step when the required torque capacity Treq becomes equal to or larger than the increase reference value (Ttgt+A). Also, the low-resolution command torque capacity Ttgt is decreased by one step when the required torque capacity Treq becomes equal to or smaller than the decrease reference value (Ttgt−B). As a result, the low-resolution command torque capacity Ttgt can be prevented from fluctuating (hunting) in response to oscillatory changes of the required torque capacity Treq.

In a fourth disclosed embodiment, the high-resolution command torque capacity Ttgt is set to the same value as the torque capacity Treq required between the first roller 31 and the second roller 32 as in the third embodiment. Also, the low-resolution command torque capacity Ttgt is computed in an ongoing manner based on the required torque capacity Treq between the first roller 31 and the second roller 32 as in the third embodiment. However, as shown in FIG. 12, the manner in which the low-resolution command torque capacity Ttgt is computed is different from the third embodiment.

Figure 12:
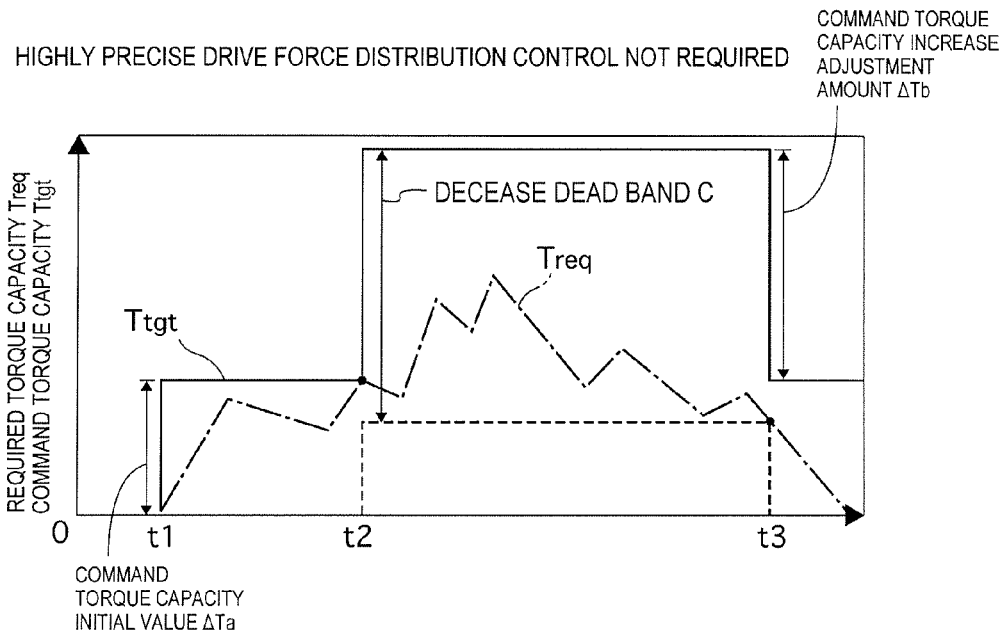
FIG. 12 illustrates an example of a time variation characteristic of a low-resolution command torque capacity during a drive force distribution control of a drive force distributing apparatus according to a fourth disclosed embodiment.

That is, in the fourth embodiment, the low-resolution command torque capacity Ttgt is increased by a first step amount ΔTa from 0 to an initial value at a time t1 when the required torque capacity Treq begins to rise as shown in FIG. 12. Thereafter, the low-resolution command torque capacity Ttgt is controlled based on a current low-resolution command torque capacity Ttgt and a decrease reference value (Ttgt−C) that is smaller than the current low-resolution command torque capacity Ttgt by an amount equal to a decrease dead band width C. The low-resolution command torque capacity Ttgt is increased by the first step amount ΔTb at a time t2 when the required torque capacity Treq becomes equal to or larger than the current low-resolution command torque capacity Ttgt. The low-resolution command torque capacity Ttgt is decreased by the first step amount ΔTb at a time t3 when the required torque capacity Treq becomes equal to or smaller than the decrease reference value (Ttgt−C).

Accordingly, the low-resolution command torque capacity Ttgt as shown in FIG. 12 can be used when an operating condition exists that does not required highly precise drive force distribution control.

Thus, the low-resolution command torque capacity Ttgt remains at a constant value for long periods of time. As with the other embodiments, the energy loss incurred during the drive force distribution control is reduced without adversely affecting the drive force distribution control. Thus, a large energy loss during a drive force distribution control can be reliably prevented.

Furthermore, in the fourth embodiment, the low-resolution command torque capacity Ttgt is increased by the first step amount ΔTb when the required torque capacity Treq becomes equal to or larger than the current low-resolution command torque capacity Ttgt. Also, the low-resolution command torque capacity Ttgt is decreased by the first step amount ΔTb when the required torque capacity Treq becomes equal to or smaller than the decrease reference value (Ttgt−C). As a result, the low-resolution command torque capacity Ttgt can be prevented from fluctuating (hunting) in response to oscillatory changes of the required torque capacity Treq. Additionally, with this embodiment, the command torque capacity Ttgt will not fall below the required torque capacity Treq. As a result, slippage between the rollers 31 and 32 that may disrupt the ability of the apparatus to provide the intended drive force distribution control can be avoided.

In a fifth embodiment, the high-resolution command torque capacity Ttgt is set to the same value as the torque capacity Treq required between the first roller 31 and the second roller 32 as in the third and fourth embodiments. Also, the low-resolution command torque capacity Ttgt is computed in an ongoing manner based on the required torque capacity Treq between the first roller 31 and the second roller 32 as in the third and fourth embodiments. However, as shown in FIG. 13, the manner in which the low-resolution command torque capacity Ttgt is computed is different from the third embodiment and the fourth embodiment.

Figure 13:
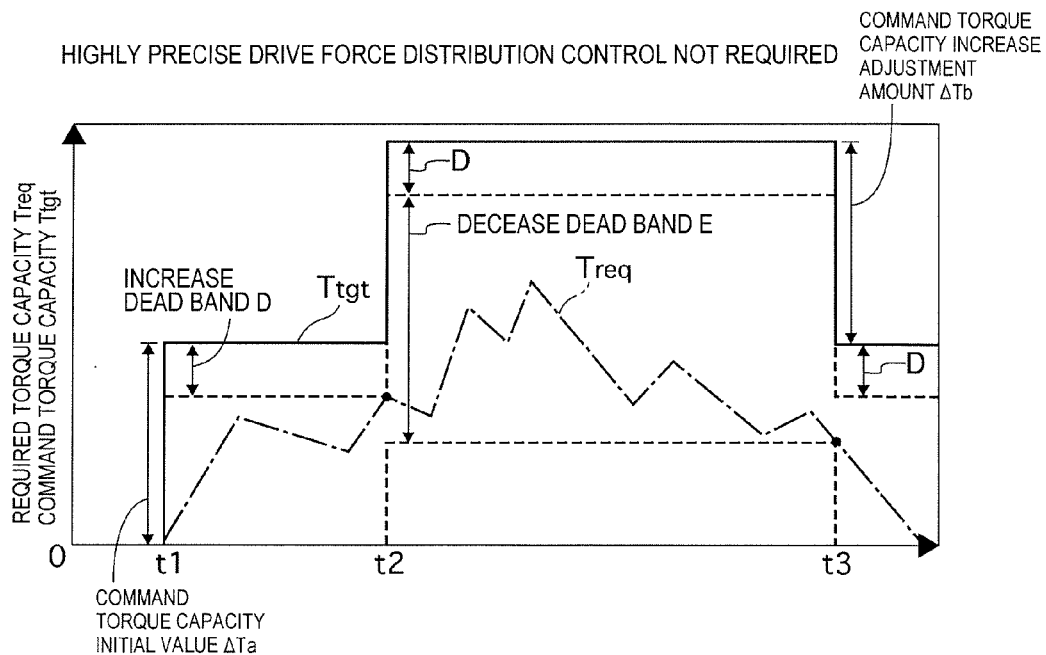
FIG. 13 illustrates an example of a time variation characteristic of a low-resolution command torque capacity during a drive force distribution control of a drive force distributing apparatus according to a fifth disclosed embodiment.

That is, as shown in FIG. 13, the low-resolution command torque capacity Ttgt is increased by a first step amount ΔTa from 0 to an initial value at a time t1 when the required torque capacity Treq starts rising. Thereafter, the low-resolution command torque capacity Ttgt is controlled based on an increase reference value (Ttgt−D) that is smaller than a current low-resolution command torque capacity Ttgt by an increase dead band width D. The low-resolution command torque capacity Ttgt is further controlled based on a decrease reference value (Ttgt−D−E) that is smaller than the increase reference value (Ttgt−D) by an amount equal to a decrease dead band width E. The low-resolution command torque capacity Ttgt is increased by a first step amount ΔTb at a time t2 when the required torque capacity Treq becomes equal to or larger than the increase reference value (Ttgt−D). The low-resolution command torque capacity Ttgt is decreased by the first step amount ΔTb at a time t3 when the required torque capacity Treq becomes equal to or smaller than the decrease reference value (Ttgt−D−E).

Thus, the low-resolution command torque capacity Ttgt remains at a constant value for long periods of time. As with the other embodiments, the energy loss incurred during the drive force distribution control is reduced without adversely affecting the drive force distribution control. Hence, a large energy loss during a drive force distribution control can be reliably prevented.

Also, as noted above, the low-resolution command torque capacity Ttgt is increased by a first step amount ΔTb when the required torque capacity Treq becomes equal to or larger than the increase reference value (Ttgt−D). The low-resolution command torque capacity Ttgt is decreased by the first step amount ΔTb when the required torque capacity Treq becomes equal to or smaller than the decrease reference value (Ttgt−D−E). As a result, the low-resolution command torque capacity Ttgt can be prevented from fluctuating (hunting) in response to oscillatory changes of the required torque capacity Treq. Additionally, with this embodiment, the command torque capacity Ttgt will not fall below the required torque capacity Treq. As a result, slippage between the rollers 31 and 32 that may disrupt the ability of the apparatus to provide the intended drive force distribution control can be avoided.

It should also be noted that if the low-resolution command torque capacity Ttgt is increased by the first step amount ΔTb at a time t2 when the required torque capacity Treq becomes equal to or larger than the current low-resolution command torque capacity Ttgt as in the fourth embodiment shown in FIG. 12, then there will be a possibility that the command torque capacity Ttgt may temporarily fall below the required torque capacity Treq due to a response delay. Such an occurrence may result in slippage between the rollers 31 and 32. However, in the fifth embodiment, a value that is smaller than the current low-resolution command torque capacity Ttgt by an increase dead band width D is used as the increase reference value (Ttgt−D). Also, the low-resolution command torque capacity Ttgt is increased by the first step amount ΔTb at a time t2 when the required torque capacity Treq becomes larger than the increase reference value (Ttgt−D). As a result, the command torque value Ttgt does not fall below the required torque capacity Treq even if there is a response delay. Thus, the risk of slippage occurring between the rollers 31 and 32 can be eliminated.

In a sixth embodiment, similarly to the third to fifth embodiments, the high-resolution command torque capacity Ttgt is set to the same value as the torque capacity Treq required between the first roller 31 and the second roller 32 as in the third through fifth embodiments. Also, the low-resolution command torque capacity Ttgt is computed in an ongoing manner based on the required torque capacity Treq between the first roller 31 and the second roller 32 as in the third through fifth embodiments. However, as shown in FIG. 14, the manner in which the low-resolution command torque capacity Ttgt is computed is different from the third through fifth embodiments.

Figure 14:
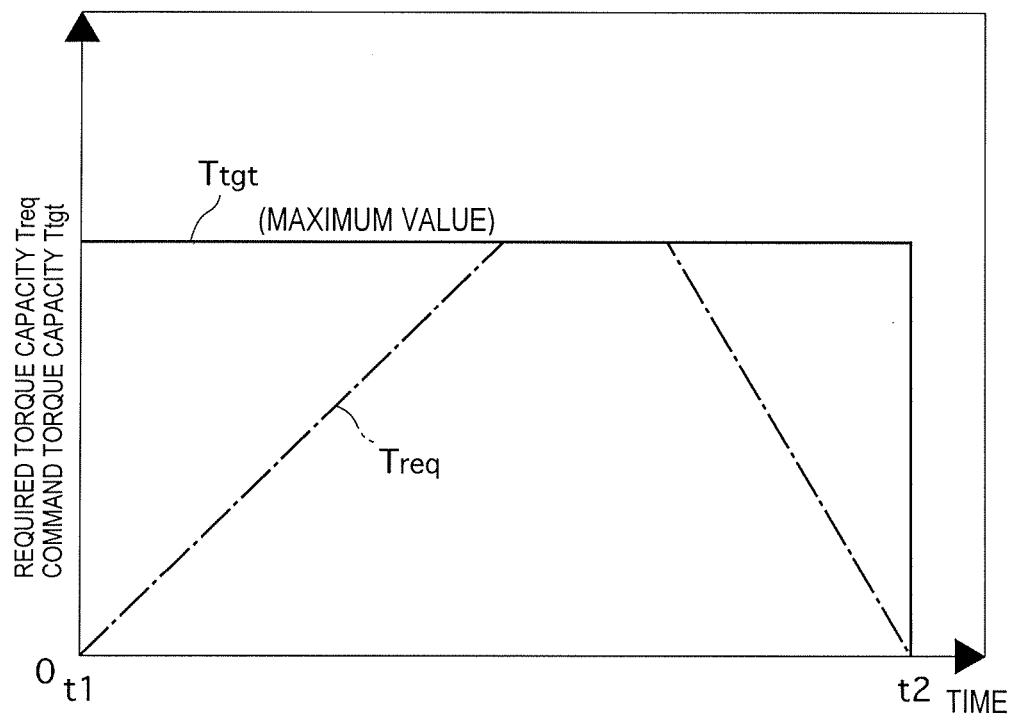
FIG. 14 illustrates an example of a time variation characteristic of a low-resolution command torque capacity during a drive force distribution control of a drive force distributing apparatus according to a sixth disclosed embodiment.

That is, as shown in FIG. 14, the low-resolution command torque Ttgt is increased from 0 to a maximum value at a time t1 when the required torque capacity Treq starts rising. Thereafter, the low-resolution command torque Ttgt is changed from the maximum value to 0 at a time t2 when the required torque capacity Treq decreases to 0.

Thus, the low-resolution command torque capacity Ttgt remains at a constant value for a period of time longer than in any of the other embodiments discussed above. Also, the energy loss incurred during the drive force distribution control is reduced without adversely affecting the drive force distribution control. Hence, a large energy loss during a drive force distribution control can be prevented even more reliably that in the other embodiments. As a result, the low-resolution command torque capacity Ttgt can be prevented from hunting in response to oscillatory changes of the required torque capacity Treq even more reliably than with the other embodiments.

Additionally, with this sixth embodiment, the command torque capacity Ttgt will not fall below the required torque capacity Treq. As a result, slippage between the rollers 31 and 32 that can result in a disruption in the ability of the apparatus to provide the intended drive force distribution can be prevented.

In the embodiments described above, a torque diode 61 is used as an irreversible transmission mechanism that is inserted into the drive force distribution control train as shown in FIGS. 2, 4, 5 and 6. However, a torque diode 61 need not be used as the irreversible transmission mechanism. For example, a worm gearbox having a worm and a worm wheel can be used as the irreversible transmission mechanism. However, since a worm gearbox generally has poorer transmission efficiency than a torque diode 61, the use of a torque diode 61 can be more advantageous with regard to the agility of the force distribution control and a reduction in electric power consumption.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle drive force distributing apparatus. Accordingly, these terms, as utilized to describe the present invention should be interpreted relative to a vehicle equipped with the vehicle drive force distributing apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle drive force distributing apparatus comprising:
    an irreversible transmission mechanism configured to prevent a radially oriented pressing force, generated between a first roller and a second roller by an inter-roller radial pressing force generating source in response to an inter-roller radial pressing force command value, from decreasing during a period while the inter-roller radial pressing force command value is constant, such that the irreversible transmission mechanism maintains the radially oriented pressing force at a value prescribed by the inter-roller radial pressing force command value without operating the inter-roller radial pressing force generating source during the period while the inter-roller radial pressing force command value is constant, the first roller being mechanically coupled to a main drive wheel and the second roller being mechanically coupled to a subordinate drive wheel and configured to distribute a drive force to the subordinate drive wheel by frictionally contacting the first roller such that a drive force distribution between the main drive wheel and the subordinate drive wheel is based on the radially oriented pressing force;
    an operating state determining component configured to determine whether a first vehicle operating state exists during which a first precision level of drive force distribution control is to be performed between the main drive wheel and the subordinate drive wheel or a second vehicle operating state exists during which a second precision level of drive force distribution control, less than the first precision level, is to be performed between the main drive wheel and the subordinate drive wheel; and
    a command value resolution switching component configured to provide the inter-roller radial pressing force command value to the inter-roller radial pressing force generating source when the operating state determining component determines that the second vehicle operating state exists, such that the period while the inter-roller radial pressing force command value is constant is longer when the second vehicle operating state exists than when the operating state determining component determines that the first vehicle operating state condition exists.

2. The vehicle drive force distributing apparatus according to claim 1, wherein
    the operating state determining component is configured to determine that the first vehicle operating state exists when at least one of the main drive wheel and the subordinate drive wheel is being steered and to determine that the second vehicle operating state exists when neither the main drive wheel nor the subordinate drive wheel is being steered.

3. The vehicle drive force distributing apparatus according to claim 1, wherein
    the operating state determining component is configured to determine that the first vehicle operating state exists when at least one wheel of the main drive wheel and the subordinate drive wheel is undergoing antilock braking control and to determine that the second vehicle operating state exists when neither the main drive wheel nor the subordinate drive wheel is undergoing antilock braking control.

4. The vehicle drive force distributing apparatus according to claim 1, wherein
    the operating state determining component is configured to determine that the first vehicle operating state exists when at least one wheel of the main drive wheel and the subordinate drive wheel is undergoing braking force dynamic control and to determine that the second vehicle operating state exists when neither the main drive wheel nor the subordinate drive wheel is undergoing braking force dynamic control.

5. The vehicle drive force distributing apparatus according to claim 1, wherein
the command value resolution switching component is configured to determine a relationship of the inter-roller radial pressing force command value provided to the inter-roller radial pressing force generating source with respect to a required inter-roller radial pressing force value indicating a radial pressing force required between the first roller and the second roller that has been determined in advance, and to set the inter-roller radial pressing force command value provided to the inter-roller radial pressing force generating source based on the required inter-roller radial pressing force value when the operating state determining component determines that the second vehicle operating state exists.

6. The vehicle drive force distributing apparatus according to claim 5, wherein
the set inter-roller pressing force command value is related to the required inter-roller radial pressing force value such that the set inter-roller pressing force command value is maintained at a value equal to or larger than the required inter-roller radial pressing force value.

7. The vehicle drive force distributing apparatus according to claim 5, wherein
the set inter-roller pressing force command value is set such that a required inter-roller radial pressing force value at which the set inter-roller pressing force command value decreases is smaller than a required inter-roller radial pressing force value at which the set pressing force command value increases.

8. The vehicle drive force distributing apparatus according to claim 1, wherein
the command value resolution switching component is configured to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value by a first step from zero to an initial value when the required inter-roller radial pressing force value starts rising, and thereafter, the command value resolution switching component adjusts the inter-roller radial pressing force command value based on an increase reference value that is larger than the inter-roller radial pressing force command value by an amount equal to an increased dead band width and a decrease reference value that is smaller than the inter-roller radial pressing force command value by an amount equal to a decreased dead band width, such that the command value resolution switching component increases the inter-roller radial pressing force command value by one step when the required inter-roller radial pressing force value becomes equal to or larger than the increase reference value and decreases the inter-roller radial pressing force command value by one step when the required inter-roller radial pressing force value becomes equal to or smaller than the decrease reference value.

9. The vehicle drive force distributing apparatus according to claim 1, wherein
the command value resolution switching is configured to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value by a first step from zero to an initial value when the required inter-roller radial pressing force value starts rising, and thereafter, the command value resolution switching component adjusts the inter-roller radial pressing force command value based on the inter-roller radial pressing force command value and a decrease reference value that is smaller than the inter-roller radial pressing force command value by an amount equal to a decreased dead band width, such that the command value resolution switching component increases the inter-roller radial pressing force command value by one step when the required inter-roller radial pressing force value becomes equal to or larger than the inter-roller radial pressing force command value and decreases the inter-roller radial pressing force command value by one step when the required inter-roller radial pressing force value becomes equal to or smaller than the decrease reference value.

10. The vehicle drive force distributing apparatus according to claim 1, wherein
the command value resolution switching component is configured to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value by a first step from zero to an initial value when the required inter-roller radial pressing force value starts rising, and thereafter, the command value resolution switching component adjusts the inter-roller radial pressing force command value based on an increase reference value that is smaller than the inter-roller radial pressing force command value by an amount equal to an increased dead band width and a decrease reference value that is smaller than the increase reference value by an amount equal to an decreased dead band width, such that the command value resolution switching component increases the inter-roller radial pressing force command value by one step when the required inter-roller radial pressing force value becomes equal to or larger than the increase reference value and decreases the inter-roller radial pressing force command value by one step when the required inter-roller radial pressing force value becomes equal to or smaller than the decrease reference value.

11. The vehicle drive force distributing apparatus according to claim 1, wherein
the command value resolution switching component is contrived to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value from zero to a maximum value when the required inter-roller radial pressing force value starts rising and decreases the inter-roller radial pressing force command value from the maximum value to zero when the required inter-roller radial pressing force value falls to zero.

12. The vehicle drive force distributing apparatus according to claim 1, wherein
the command value resolution switching component is configured to use a required radial pressing force that is required between the first roller and the second roller as the inter-roller radial pressing force command value that is provided to the inter-roller radial pressing force generating source when the operating state determining component determines that the first operating state exists.

13. The vehicle drive force distributing apparatus according to claim 2, wherein
the operating state determining component is configured to determine that the first vehicle operating state exists when at least one wheel of the main drive wheel and the subordinate drive wheel is undergoing antilock braking control and to determine that the second vehicle operating state exists when neither the main drive wheel nor the subordinate drive wheel is undergoing antilock braking control.

14. The vehicle drive force distributing apparatus according to claim 2, wherein
the operating state determining component is configured to determine that the first vehicle operating state exists when at least one wheel of the main drive wheel and the subordinate drive wheel is undergoing braking force dynamic control and to determine that the second vehicle operating state exists when neither the main drive wheel nor the subordinate drive wheel is undergoing braking force dynamic control.

15. The vehicle drive force distributing apparatus according to claim 3, wherein
the operating state determining component is configured to determine that the first vehicle operating state exists when at least one wheel of the main drive wheel and the subordinate drive wheel is undergoing braking force dynamic control and to determine that the second vehicle operating state exists when neither the main drive wheel nor the subordinate drive wheel is undergoing braking force dynamic control.

16. The vehicle drive force distributing apparatus according to claim 2, wherein
the command value resolution switching component is configured to determine a relationship of the inter-roller radial pressing force command value provided to the inter-roller radial pressing force generating source with respect to a required inter-roller radial pressing force value indicating a radial pressing force required between the first roller and the second roller that has been determined in advance, and to set the inter-roller radial pressing force command value provided to the inter-roller radial pressing force generating source based on the required inter-roller radial pressing force value when the operating state determining component determines that the second vehicle operating state exists.

17. The vehicle drive force distributing apparatus according to claim 3, wherein
the command value resolution switching component is configured to determine a relationship of the inter-roller radial pressing force command value provided to the inter-roller radial pressing force generating source with respect to a required inter-roller radial pressing force value indicating a radial pressing force required between the first roller and the second roller that has been determined in advance, and to set the inter-roller radial pressing force command value provided to the inter-roller radial pressing force generating source based on the required inter-roller radial pressing force value when the operating state determining component determines that the second vehicle operating state exists.

18. The vehicle drive force distributing apparatus according to claim 4, wherein
the command value resolution switching component is configured to determine a relationship of the inter-roller radial pressing force command value provided to the inter-roller radial pressing force generating source with respect to a required inter-roller radial pressing force value indicating a radial pressing force required between the first roller and the second roller that has been determined in advance, and to set the inter-roller radial pressing force command value provided to the inter-roller radial pressing force generating source based on the required inter-roller radial pressing force value when the operating state determining component determines that the second vehicle operating state exists.

19. The vehicle drive force distributing apparatus according to claim 2, wherein
the command value resolution switching component is configured to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value by a first step from zero to an initial value when the required inter-roller radial pressing force value starts rising, and thereafter, the command value resolution switching component adjusts the inter-roller radial pressing force command value based on an increase reference value that is larger than the inter-roller radial pressing force command value by an amount equal to an increased dead band width and a decrease reference value that is smaller than the inter-roller radial pressing force command value by an amount equal to a decreased dead band width, such that the command value resolution switching component increases the inter-roller radial pressing force command value by one step when the required inter-roller radial pressing force value becomes equal to or larger than the increase reference value and decreases the inter-roller radial pressing force command value by one step when the required inter-roller radial pressing force value becomes equal to or smaller than the decrease reference value.

20. The vehicle drive force distributing apparatus according to claim 2, wherein
the command value resolution switching is configured to compute and set the inter-roller radial pressing force command value provided to the inter-roller radial pressing force generating source based on a required inter-roller radial pressing force value indicating radial pressing force required between the first roller and the second roller, such that the command value resolution switching component increases the inter-roller radial pressing force command value by a first step from zero to an initial value when the required inter-roller radial pressing force value starts rising, and thereafter, the command value resolution switching component adjusts the inter-roller radial pressing force command value based on the inter-roller radial pressing force command value and a decrease reference value that is smaller than the inter-roller radial pressing force command value by an amount equal to a decreased dead band width, such that the command value resolution switching component increases the inter-roller radial pressing force command value by one step when the required inter-roller radial pressing force value becomes equal to or larger than the inter-roller radial pressing force command value and decreases the inter-roller radial pressing force command value by one step when the required inter-roller radial pressing force value becomes equal to or smaller than the decrease reference value.

* * * * *

UNITED STATES PATENT AND TRADEMARK OFFICE
CERTIFICATE OF CORRECTION

PATENT NO. : 8,500,596 B2  
APPLICATION NO. : 13/118193  
DATED : August 6, 2013  
INVENTOR(S) : Eigo Sakagami et al.

Page 1 of 1

It is certified that error appears in the above-identified patent and that said Letters Patent is hereby corrected as shown below:

Title Page,

Item (75) Inventors  
Change "Egio Sakagami, Kawasaki (JP)  
      Katsuyoshi Ogawa, Yokohama (JP)"

to -- Eigo Sakagami, Kawasaki (JP)  
      Katsuyoshi Ogawa, Yokohama (JP) --.

Signed and Sealed this  
Twenty-second Day of October, 2013

Teresa Stanek Rea  
*Deputy Director of the United States Patent and Trademark Office*